(No Model.) 3 Sheets—Sheet 1.
W. P. GAMMONS, Jr. & G. S. BRACHER.
MACHINE FOR ATTACHING BINDINGS TO CURLED OR ROLLED BRIMS OF HATS.
No. 591,754. Patented Oct. 12, 1897.

(No Model.) 3 Sheets—Sheet 3.

W. P. GAMMONS, Jr. & G. S. BRACHER.
MACHINE FOR ATTACHING BINDINGS TO CURLED OR ROLLED BRIMS OF HATS.

No. 591,754. Patented Oct. 12, 1897.

Witnesses:

Inventors
W. P. Gammons Jr.
G. S. Bracher
By James J. Sheehy
Attorney

UNITED STATES PATENT OFFICE.

WELCOME P. GAMMONS, JR., OF NEW YORK, N. Y., AND GEORGE S. BRACHER, OF RAHWAY, NEW JERSEY.

MACHINE FOR ATTACHING BINDINGS TO CURLED OR ROLLED BRIMS OF HATS.

SPECIFICATION forming part of Letters Patent No. 591,754, dated October 12, 1897.

Application filed July 31, 1895. Serial No. 557,697. (No model.)

*To all whom it may concern:*

Be it known that we, WELCOME P. GAMMONS, Jr., residing at New York, in the county of New York and State of New York, and GEORGE S. BRACHER, residing at Rahway, in the county of Union and State of New Jersey, citizens of the United States, have invented certain new and useful Improvements in Machines for Attaching Bindings to the Curled or Rolled Brims of Hats; and we do declare the following to be a full, clear, and exact description of the invention, such as will enable others skilled in the art to which it appertains to make and use the same.

Our invention relates to sewing-machines, and contemplates the provision of a highly-efficient machine for attaching bindings to the curled or rolled brims of hats.

Other objects and advantages of the invention will be fully understood from the following description and claims when taken in connection with the annexed drawings, in which—

Figure 1:
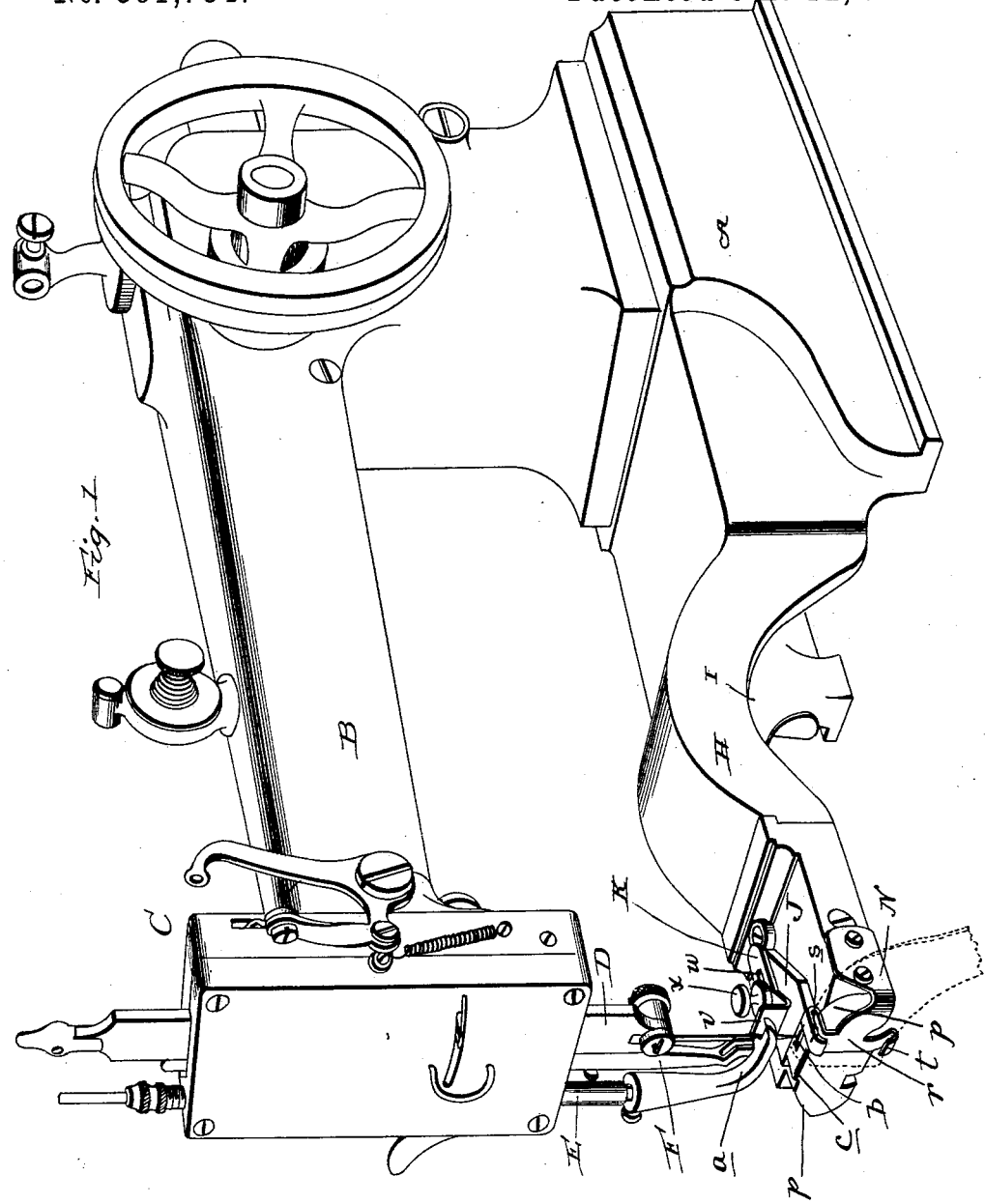
Figure 2:
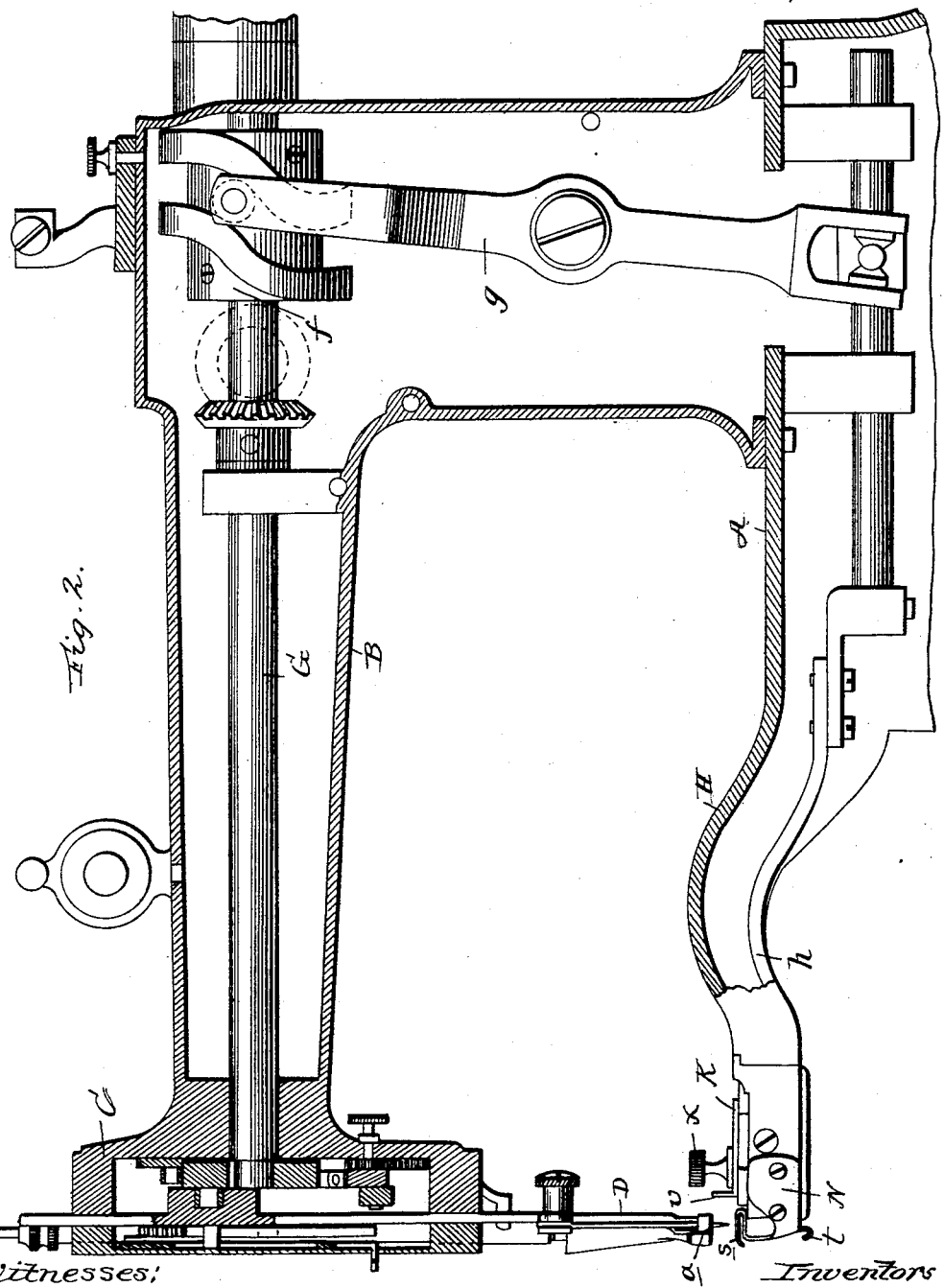
Figure 3:
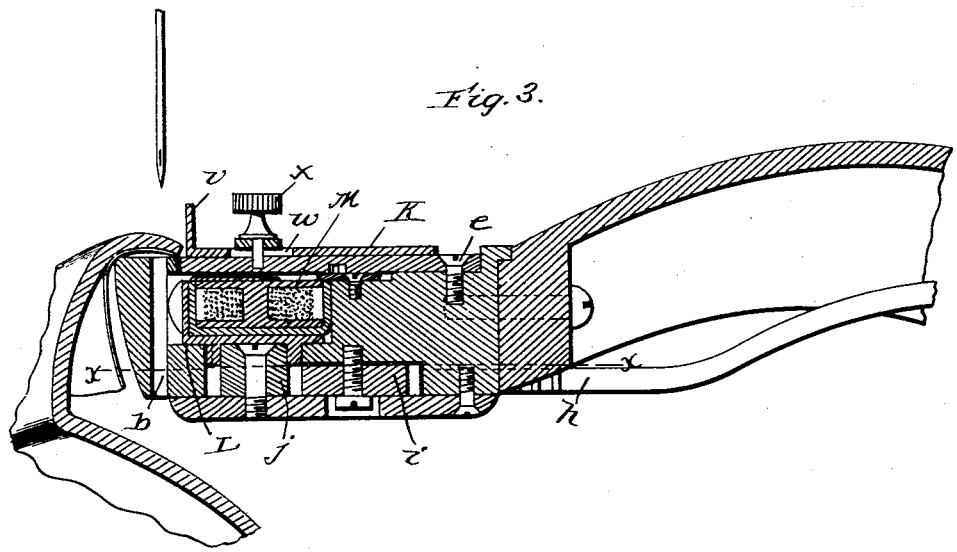
Figure 4:
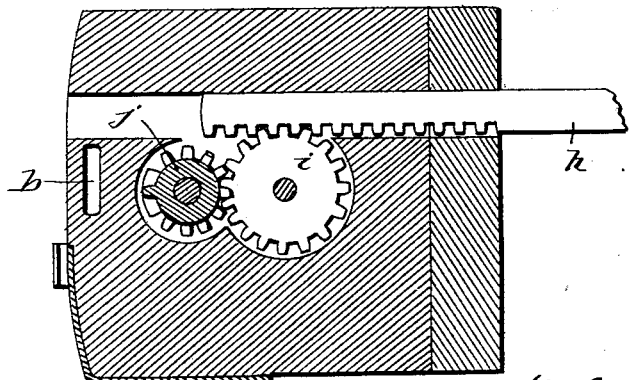
Figure 5:
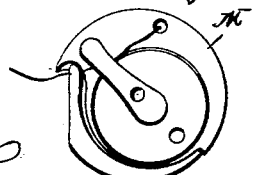
Figure 6:
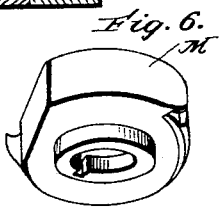

Figure 1 is a perspective view of our improved sewing-machine. Fig. 2 is vertical longitudinal section of the same with parts in elevation. Fig. 3 is a detail longitudinal section, on an enlarged scale, of the work-supporting arm. Fig. 4 is a detail section taken in the plane indicated by the line $xx$ of Fig. 3. Figs. 5 and 6 are detail views of the shuttle removed from the race.

In the said drawings similar letters designate corresponding parts in all of the views, referring to which—

A indicates the base of the machine, and B indicates the overhanging arm, having the head C at its forward end, in which are arranged the needle-bar D, the presser-bar E, having the foot $a$ at its lower end, and the feed-bar F. The said needle-bar, presser-bar, and feed-bar may be similar in construction to those disclosed in the Letters Patent of J. A. Davis, No. 251,195, and like the needle-bar and feed-bar of said patent the bars D and F may be operated by the drive-shaft G through the medium of mechanism contained in the head C, the needle-bar D being reciprocated vertically, while the feed-bar F is given, respectively, an up-and-down movement and a forward-and-backward horizontal movement in relation to the work-plate in order to feed the materials forwardly, as will be hereinafter more fully described.

Extending forwardly from the forward end of the base A, as better shown in Fig. 2, is the work-supporting arm H of our improved machine. This arm H has the rear portion of its under side concaved, as indicated by I, to accommodate the crown of a stiff hat to which the binding is being connected, and this concavity may be afforded by recessing the under side of the arm or by bending the arm into a concavo-convex form, as illustrated, the latter manner being preferable for obvious reasons. At its forward end, which rests beneath the needle, feed, and presser bars, as shown, the arm H is made straight, flat, and comparatively thin for reasons which will presently appear, and it is provided adjacent to its forward end with the vertically-disposed needle-receiving aperture $b$, and preferably has the portion $c$ in which said aperture is formed raised, as illustrated, so that its upper side will rest flush with the plate J, upon which the gage K, presently described, is mounted.

L indicates the horizontal race for the loop-taking device M, which may, if desired, be an oscillatory shuttle of the well-known construction illustrated. This race L, which communicates with the needle-opening $b$, as better shown in Fig. 3, is normally covered by the plate J, and the shuttle M which it contains is oscillated by the same shaft G that operates the needle-bar and feed-bar through the medium of the cam $f$, the lever $g$, the reciprocatory rack $h$, the gear-wheel $i$, and the pinion $j$, or any other suitable intermediate mechanism, the pinion $j$ (when employed) being removably splined to the shuttle, as shown, so as to permit of the latter being readily removed when the plate J is swung to one side on its pivot $e$ to open the race L.

The corners of the upper side of the arm H at the forward end of the same are rounded or beveled, as indicated by $p$, so that no sharp angles, which would tend to injure a hat-brim, are presented to the same as it is fed beneath the needle.

N indicates the binding-guide of the machine, which is preferably formed of sheet metal, although other material may be employed, if found desirable. This guide N is shown as formed in one piece and attached to the side of the arm H, and it has its free portion r bent so as to rest in a vertical plane parallel to and close against the forward end of the said arm and also has the retaining-loop s, which rests upon the upper side of the arm H, close to one end of the portion c thereof, and the retaining-loop t, which rests slightly below the arm, as shown.

K indicates the gage against which the edge of the hat-brim is pressed by the operator in order to have all the stitches take through the brim and binding at a uniform distance from the edge of the former, so as to make a neat and finished job. This gage K may be formed and may be adjusted and adjustably fixed in any suitable manner, but I prefer to form it of sheet metal and provide it with the upturned lip v at its forward end and with the longitudinal slot w and adjustably connect it with the plate J by a binding-screw x, as by this construction it may be readily adjusted and adjustably fixed so as to permit of taking the stitches through the brim at various distances from the edge of the brim.

In the practical operation of our improved machine after the gage K has been properly adjusted the binding is placed in the guide N so that its upper portion will overlap the forward thin and flat end of the work-supporting arm, as illustrated by dotted lines in Fig. 1. The brim of the hat is then placed upon the end of the arm over the binding and its edge is pressed against the gage K by the operator when the machine is started, and the stitching of the binding to the brim is commenced and continued until the binding is connected throughout its length to the brim. We prefer in practice to start the stitching at the back of the hat and stitch entirely around the hat to the point of commencement. While the stitching of the binding to the front or back end portions of the hat-brim is going on the hat rests and is held with the crown depending, but as the stitching progresses toward and along the side of the brim the hat must be gradually turned until the crown rests in a horizontal or approximately horizontal position, with the inside of the hat toward the operator and the crown in the concavity above mentioned, and as the stitching further progresses the hat must be turned, so that when it reaches the end of the brim opposite to the point of commencement it will rest in the position first mentioned—viz., with its crown depending. From this point the operation is repeated to the point of commencement—that is to say, the hat is slowly turned until when the stitching reaches the middle of the side of the hat-brim its crown rests in an approximately horizontal position beneath the arm H, and from this point to the point of commencement the hat is slowly turned until when it reaches its point of commencement its crown will rest in a depending position.

The concavity of the arm H permits of the hat being turned freely into the horizontal position stated, and as it is absolutely necessary to get the hat into such position in order to sew the binding to the sides of the brim in a finished manner, especially when the brim is provided with the fashionable deep rolls or curls, it will be appreciated that the concavity of the said arm H forms an important feature of our invention.

It will also be appreciated from the foregoing that the forward end of the arm H being flat and comparatively thin is adapted to take between the fashionable deep rolled or curled brims of stiff hats and the crowns thereof without stretching the brims out of shape and without in any way injuring the connection of the same to the crowns.

After the piece of binding has been attached along one edge and throughout its length to the inner side of the hat-brim its ends are "snapped" or sewed together, after which it is turned outwardly over the curled brim, when it will be snugly and tightly held thereon. This is due to the fact that the outer side of the brim is larger than the inner side, and consequently when the ends of the binding are snapped or connected together after one edge of said binding is connected to the brim and before it is turned over the same the free edge of the binding is strained and sprung over the brim under considerable tension, varying according to the thickness of the felt. This, as stated, renders the binding tight upon the brim, but in order to avoid any possibility of the binding coming off during use its outer edge may, if desired, be stitched by hand to the brim or otherwise suitably secured.

The hat with the binding applied in the manner described forms the subject-matter of our contemporary application, filed June 24, 1897, Serial No. 642,167.

As is obvious, when a piece of binding is to be attached to a hat-brim the distance of the line of stitches from the edge of the brim may be varied to suit various kinds of hats by suitably adjusting and adjustably fixing the gage K.

During the operation of stitching the binding to the hat-brim the feed-bar F, by its up-and-down and forward-and-backward horizontal movements, serves to feed the hat and consequently the binding forwardly and at the same time holds the hat-brim to the needle-plate while it is being fed.

It will be observed that our improved machine is very simple and that its construction is such that the parts are not likely to get out of order, and it will also be observed that the stitching of the binding to the brim may be accomplished as easily when the brim is deeply curled or rolled as when it is but slightly curled or rolled, and this without in any way damaging the brim or changing or destroying its shape.

The shuttle M coöperates with the needle in the usual manner, and it is disposed horizontally, as described, so as to permit of the arm H being made thin in order to enable it to readily take between the brim and crown of the hat, as illustrated in Fig. 3. The shuttle M alone forms no part of our invention, and any suitable loop-taking device may be employed in lieu of the same.

The needle-bar, feed-bar, and presser-bar, with the mechanism for transmitting motion to the same, when considered alone also do not form a part of the invention, and any suitable mechanism which embodies a practical feed device may be employed in lieu of the same.

We have specifically described the foregoing and other parts of our improvements in order to impart a full, clear, and exact understanding of the invention, but we desire it distinctly understood that we do not confine ourselves to any exact construction and arrangement of parts, as such changes or modifications may be made in practice as fairly fall within the scope of our invention.

Having described our invention, what we claim is—

1. A sewing-machine comprising a work-supporting arm having the comparatively thin and flat portion at its forward end adapted to take between the brim and crown of a stiff hat and the concavity I, in its under side in rear of said thin and flat portion adapted to receive the crown of a hat; the said concavity I, extending above the lower side of the forward flat and thin portion and being disposed at right angles to the length of the arm, a loop-taking device arranged in said arm adjacent to its forward end, a hat-gage arranged upon and adjustably connected to the upper side of the work-supporting arm adjacent to the forward end thereof, the binding-guide arranged upon the forward end of the work-supporting arm and having the lower loop $t$, adapted to receive the lower edge of the binding and support the same and the upper horizontally-disposed loop $s$, arranged upon the upper side of the work-supporting arm, an overhanging arm carrying a needle-bar and a feeding device, and means for operating the needle-bar, feeding device and loop-taker, substantially as and for the purpose set forth.

2. A sewing-machine comprising a work-supporting arm having the corners of its upper side beveled at its forward end as indicated by $p$, a hat-gage arranged upon and adjustably connected to the upper side of the work-supporting arm adjacent to the forward end thereof, the binding-guide arranged upon the forward end of the work-supporting arm and having the lower loop $t$, adapted to receive the lower edge of the binding and support the same and the upper horizontally-disposed loop $s$, arranged upon the upper side of the work-supporting arm, a feeding device, and a suitable organized stitch-forming mechanism, substantially as and for the purpose set forth.

3. A hat-sewing machine comprising the work-supporting arm H, having the comparatively thin and flat portion at its forward end adapted to take between the brim and crown of a stiff hat and the concavity I, in its under side in rear of said thin and flat portion adapted to receive the crown of a hat; the said concavity I, extending above the lower side of the forward flat and thin portion and being disposed at right angles to the length of the arm, a hat-gage carried by the arm H, a binding-guide also carried by said arm and a suitable organized stitch-forming mechanism, substantially as and for the purpose set forth.

In testimony whereof we affix our signatures in presence of two witnesses.

WELCOME P. GAMMONS, Jr.
GEORGE S. BRACHER.

Witnesses:
JAMES A. HUDSON,
ARTHUR C. BLATZ.